(12) United States Patent
Song

(10) Patent No.: US 9,348,370 B2
(45) Date of Patent: May 24, 2016

(54) FLEXIBLE DISPLAY DEVICE HAVING GUIDE MEMBER

(71) Applicant: PREXCO CO., LTD., Chungcheongnam-do (KR)

(72) Inventor: In-Sung Song, Gyeonggi-do (KR)

(73) Assignee: PREXCO CO., LTD, Chungcheongnam-Do (KR)

( * ) Notice: Subject to any disclaimer, the term of this patent is extended or adjusted under 35 U.S.C. 154(b) by 117 days.

(21) Appl. No.: 14/195,284

(22) Filed: Mar. 3, 2014

(65) Prior Publication Data

US 2015/0077917 A1 Mar. 19, 2015

(30) Foreign Application Priority Data

Sep. 16, 2013 (KR) ........................ 10-2013-0111003

(51) Int. Cl.
*G06F 1/16* (2006.01)

(52) U.S. Cl.
CPC ............ *G06F 1/1652* (2013.01); *G06F 1/1681* (2013.01)

(58) Field of Classification Search
CPC ... G06F 1/1652; G06F 1/1618; G06F 1/1681; G06F 1/162; E05D 3/06; E05D 3/16; Y10T 16/525; Y10T 16/5253; Y10T 16/5257; Y10T 16/53864; Y10T 16/5387; Y10T 16/5388; Y10T 16/547; Y10T 16/5474; Y10T 16/5475; Y10T 16/5476; Y10T 16/5478; Y10T 16/546
USPC ........... 16/225–227, 302, 303, 304, 366, 368, 16/369, 370, 371; 361/679.27, 727
See application file for complete search history.

(56) References Cited

U.S. PATENT DOCUMENTS

| | | | | |
|---|---|---|---|---|
| 2009/0126155 A1* | 5/2009 | Nieuwenhuizen | .. | H04M 1/0216 16/302 |
| 2010/0232100 A1* | 9/2010 | Fukuma | ................... | F16G 13/18 361/679.01 |
| 2012/0262887 A1* | 10/2012 | Park | ....................... | G06F 1/1624 361/749 |
| 2012/0307423 A1* | 12/2012 | Bohn | .................... | G06F 1/1641 361/679.01 |
| 2014/0099479 A1* | 4/2014 | Krall | ......................... | B32B 3/28 428/174 |
| 2014/0123436 A1* | 5/2014 | Griffin | ................. | H04M 1/0216 16/221 |

FOREIGN PATENT DOCUMENTS

| | | |
|---|---|---|
| KR | 1020090030869 | 10/2010 |
| KR | 1013461460000 | 12/2013 |

* cited by examiner

*Primary Examiner* — Hoa C Nguyen
*Assistant Examiner* — Christopher L Augustin
(74) *Attorney, Agent, or Firm* — Fay Sharpe LLP

(57) ABSTRACT

A flexible display device having a guide member is disclosed. The flexible display device having a guide member according to the present invention includes a first plate and a second plate for attaching a flexible display screen having bending capability on the front side; a hinge member B for connecting the first plate and the second plate and performing a folding operation while being bent or spread; and a variable means formed at each of the first plate and the second plate, configured of movable plates connected to the hinge member and the guide members combined with the movable plates to guide forward and backward movement of the movable plates, and associated with the folding operation of the first plate and the second plate.

4 Claims, 6 Drawing Sheets

FLEXIBLE DISPLAY DEVICE HAVING GUIDE MEMBER

CROSS-REFERENCE TO RELATED APPLICATION

This application is based on and claims priority from Korean Patent Application No. 10-2013-0111003 filed on Sep. 16, 2013 in the Korean Intellectual Property Office, the disclosure of which is incorporated herein in its entirety by reference.

BACKGROUND OF THE INVENTION

1. Field of the Invention

The present invention relates to a flexible display device, and more particularly, to a flexible display device for smoothly guiding an operation of folding or spreading a plurality of plates on which a flexible display is attached, in a portable display device provided with a flexible display screen having bending capability.

2. Background of the Related Art

Portable terminals such as a smart phone, a tablet PC and the like which are enabled to connect to the Internet by improving cellular phones are extremely popular recently owing to development of communication techniques and advancement in semiconductor and optical techniques and has brought an innovation in science and technology since living environments of human beings are entirely changed using the portable terminals.

Particularly, although the tablet PC has an advantage of having a wide display screen, it is inconvenient to carry since it is too bulky.

Therefore, a flexible display having flexibility has been proposed to improve the problem.

As a prior technique related to a flexible display substrate which can be folded or spread, [Flexible display substrate] of Korean Patent Application No. 10-2009-0030869 has been disclosed.

A flexible display is a display which is rollable in the form of a roll or curved or bendable like a paper and has a free exterior design.

In addition, since the substrate has flexibility, the display is solid and unbreakable, and this can be understood as a thin and light display using a light substrate like plastic in some cases.

Meanwhile, the most basic form of the flexible display is folding the flexible display in half and carrying while a volume thereof is reduced by half.

Although the flexible display is folded, it cannot be bent and folded like folding a paper, it is preferable to fold the flexible display in a form having a gentle curvature.

Meanwhile, although a flexible display device according to a conventional technique has a hinge connection in most cases, in which connection parts of a plate divided into two or more pieces and a hinge unit are combined using an axis pin, there is a problem in that since a concavely bent shape remains at the middle portion of the flexible display screen even when the plate is spread, flatness of the screen is lowered.

SUMMARY OF THE INVENTION

Accordingly, the present invention has been made in view of the above-mentioned problems occurring in the prior art, and it is an object of the present invention to provide a flexible display device having a guide member, in which since both ends of a hinge unit are inserted into first and second plates to some extent in the process of folding or spreading the first and second plates on which a flexible display is attached, a force pulling both ends of the screen is generated when the first and second plates are spread, and thus the screen can be flattened, and a clear image can be expressed.

To accomplish the above object, according to the present invention, there is provided a flexible display device having a guide member, the device including: a first plate and a second plate for attaching a flexible display screen having bending capability on a front side; a hinge member for connecting the first plate and the second plate and performing a folding operation while being bent or spread; and a variable means formed at each of the first plate and the second plate, configured of a movable plate connected to the hinge member and the guide member combined with the movable plate to guide forward and backward movement of the movable plate, and associated with the folding operation of the first plate and the second plate.

The guide member includes: a flat panel unit attached to the first plate or the second plate; and a rail bent at both ends of the flat panel unit to be formed in the shape of character 'ㄷ'.

The flat panel unit includes: a concave part concaved downwards to be inserted into and combined with insides of the first plate and the second plate; and a resting step protruded at both ends of the concave part.

The movable plate has a connection pipe formed at one end to be connected to the hinge member and a stepped portion formed at one side to be insertedly combined with the rail.

The hinge member includes: a link piece rotatably combined with the first plate and the second plate and arranged in plurality to tightly contact so as to be bent with respect to each other; a link pin for connecting the link piece arranged in plurality; a tension member combined with the link pin and generating a fixing force to be fixed when the link piece performs a rotation operation; and a plate spring for wrapping an outer surface of the hinge member and having an elastic force, in which one end is connected to the first plate, and the other end is connected to the second plate.

The link piece is formed in a shape of a bar having a cross section of a rectangular shape with a predetermined length, in which inclined surfaces are symmetrically formed on both side surfaces, and pin coupling units for inserting the link pin are formed at one side or both sides, and the link pin is combined with the pin coupling units, and the tension member combined with the link pin is inserted.

The tension member includes: a fixed body tightly attached at one side of the pin coupling units, having a penetration hole formed to pass through the link pin, and having a plurality of latching depressions formed on one side surface in a radial shape; a movable body having a penetration hole formed to pass through the link pin, tightly attached to the fixed body, and having a plurality of latching projections corresponding to the plurality of latching depressions on one side surface; and a spring combined with the link pin, in which one end is tightly attached to the pin coupling units at one side and the other end is tightly attached to the movable body to generate a force pushing the movable body.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, a preferred embodiment of the present invention will be described in detail given with reference to the attached drawings.

Figure 1:
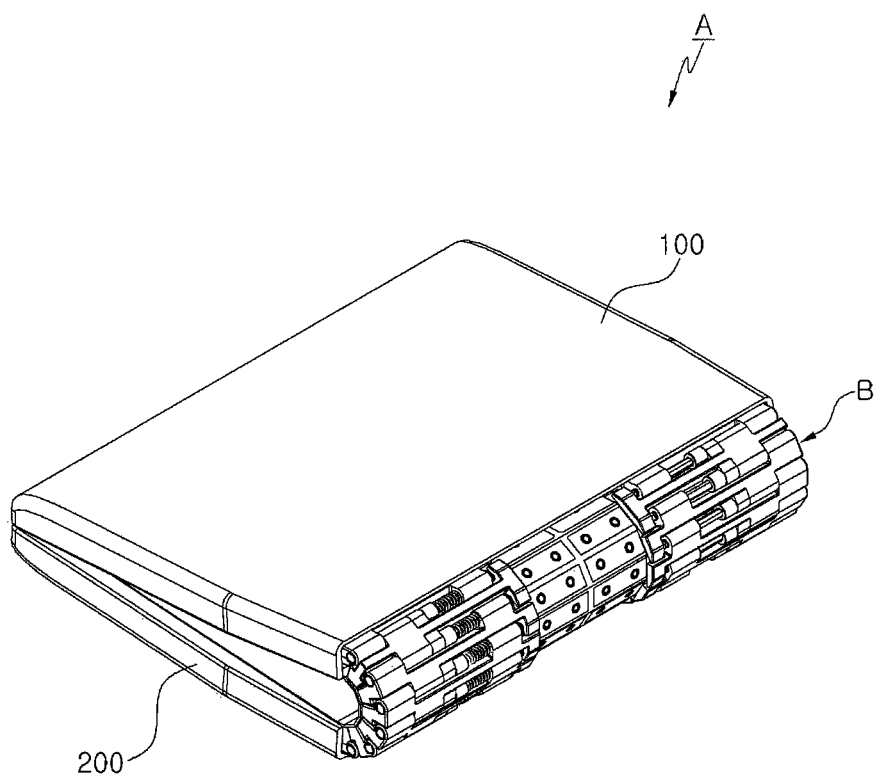
FIG. 1 is a perspective view showing a state of folding a flexible display device according to the present invention.
Figure 2:
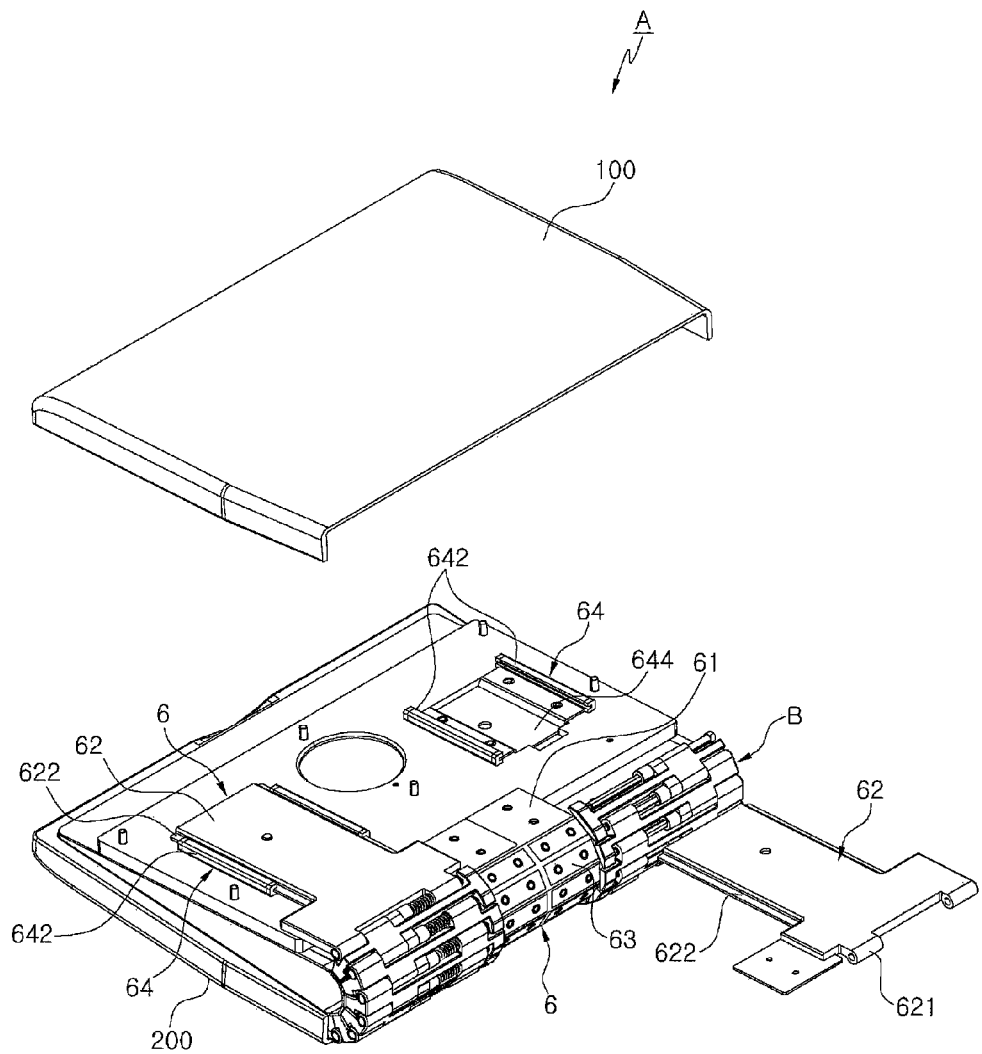
FIG. 2 is an exploded perspective view showing a flexible display device according to the present invention.
Figure 3:
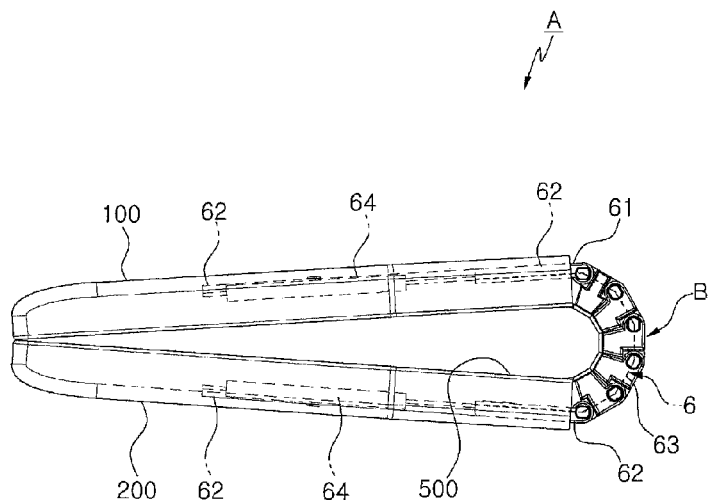
FIG. 3 is a front view showing the operation of a 'variable means' when a flexible display device according to the present invention is folded.
Figure 4:
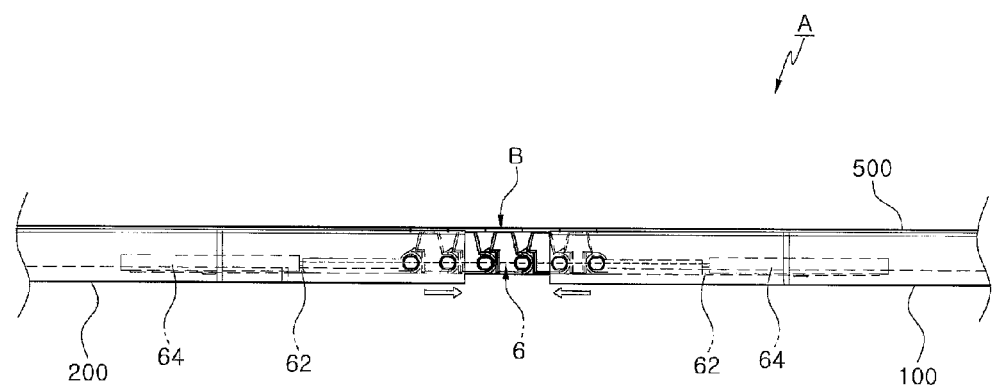
FIG. 4 is a partially enlarged front view showing the operation of a 'variable means' when a flexible display device according to the present invention is spread.
Figure 5:
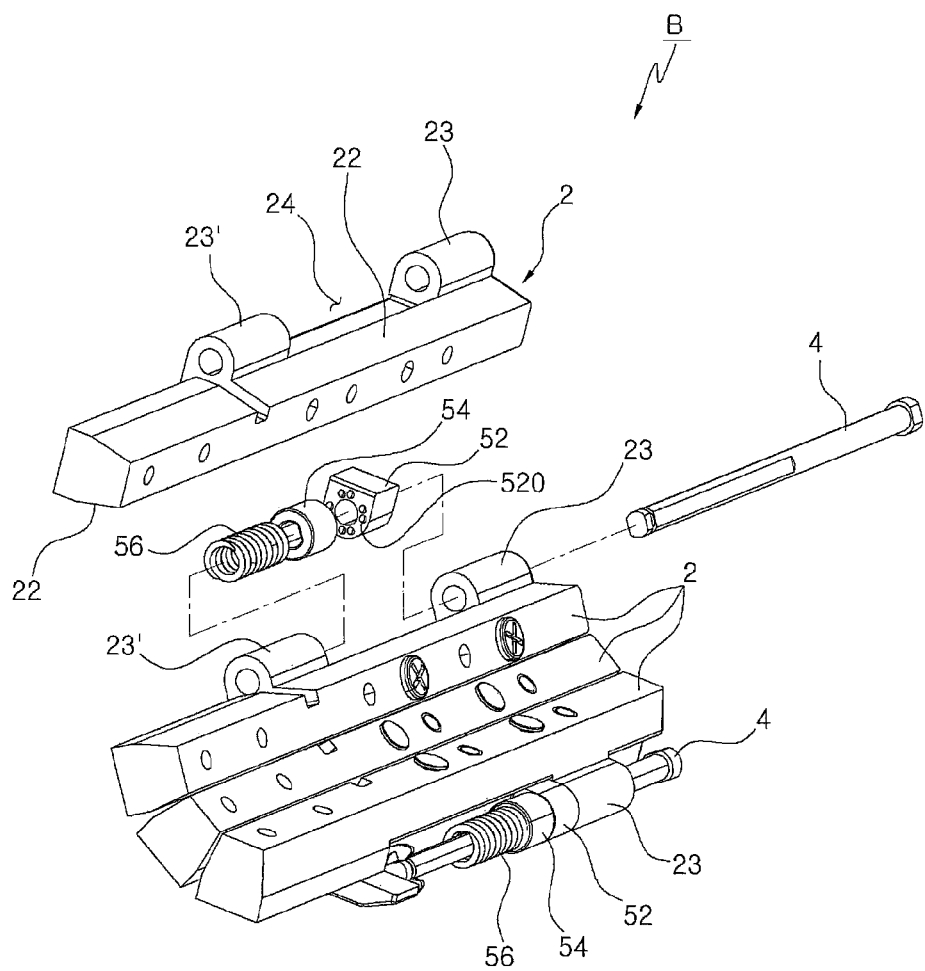
FIG. 5 is a perspective view showing a 'hinge member' in a flexible display device having a guide member according to the present invention.
Figure 6:
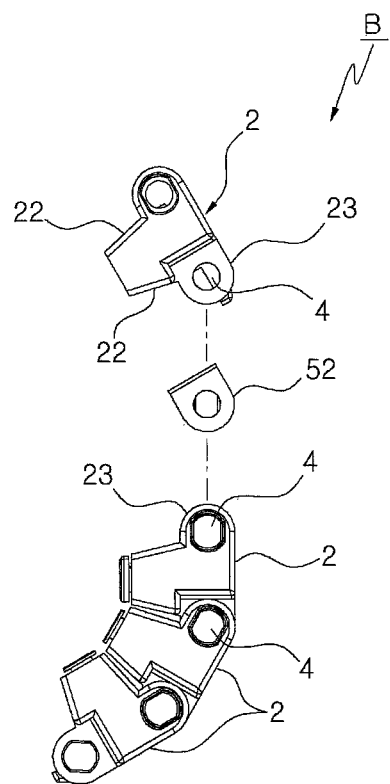
FIG. 6 is an exploded side view showing the 'hinge member' of FIG. 5.
Figure 7:
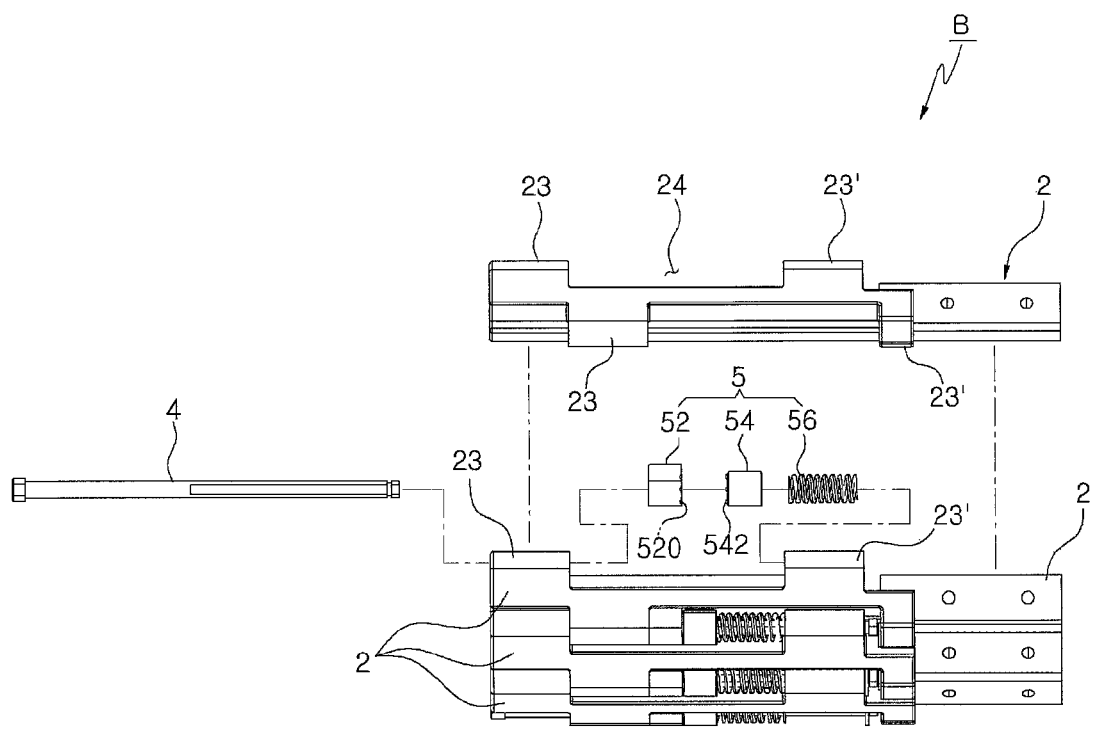
FIG. 7 is an exploded front view showing the 'hinge member' of FIG. 5.

In the attached drawings, FIG. 1 is a perspective view showing a state of folding a flexible display device according to the present invention; FIG. 2 is an exploded perspective view showing a flexible display device according to the present invention; FIG. 3 is a front view showing the operation of a 'variable means' when a flexible display device according to the present invention is folded; FIG. 4 is a partially enlarged front view showing the operation of a 'variable means' when a flexible display device according to the present invention is spread; FIG. 5 is a perspective view showing a 'hinge member' in a flexible display device having a guide member according to the present invention; FIG. 6 is an exploded side view showing the 'hinge member' of FIG. 5; and FIG. 7 is an exploded front view showing the 'hinge member' of FIG. 5.

As shown in FIGS. 1 to 7, a flexible display device a having a guide member according to the present invention includes a first plate 100 and a second plate 200 for attaching a flexible display screen having bending capability on the front side; a hinge member B for connecting the first plate 100 and the second plate 200 and performing a folding operation while being bent or spread; and a variable means 6 formed at each of the first plate 100 and the second plate 200, configured of a movable plate 62 connected to the hinge member B and the guide member 64 combined with the movable plate 62 to guide forward and backward movement of the movable plate 62, and associated with the folding operation of the first plate 100 and the second plate 200.

The first plate 100 and the second plate 200 are formed to have the same shape and area, and the hinge member B is connected between them. The hinge member B is configured as a structure connecting a plurality of links, and this will be described below.

The variable means 6 is configured of a movable plate 62 combined at one end of the hinge member B using an axis pin and arranged toward inside of the first plate 100 or the second plate 200, and a guide member 64 attached to inside of the first plate 100 or the second plate 200 and having a rail 642 formed to be combined with the movable plate 62.

The guide member 64 is configured of a flat panel unit 644 attached to the first plate 100 or the second plate 200 and the rail 642 bent at both ends of the flat panel unit 644 to be formed in the shape of character 'ㄷ'.

The movable plate 62 has a connection pipe 621 formed at one end to be connected to the hinge member B using an axis pin and a stepped portion 622 formed at one side in the length direction to be insertedly combined with the rail 642.

Accordingly, the movable plate 62 may move forward and backward while being inserted in the rail 642 of the guide member 64. The forward and backward operation of the movable plate 62 is associated with the spreading or folding operation of the first plate 100 and the second plate 200.

That is, when the first plate 100 and the second plate 200 are folded, the movable plate 62 is inserted into the guide member 64.

Contrarily, when the first plate 100 and the second plate 200 are unfold, the movable plate 62 is withdrawn from the guide member 64, and a portion of the movable plate 62 is drawn out.

The operation of the variable means is described below.

The operation of rolling or spreading the hinge member B in association with the folding operation of the first plate 100 and the second plate 200 is as described below.

An operation of facing and folding the first plate 100 and the second plate 200 or spreading and opening them in the opposite direction and an operation of slantly erecting any one of the first plate 100 and the second plate 200 may be performed.

If the first plate 100 and the second plate 200 perform a folding or spreading operation, the variable means 6 starts to operate, and the movable plate 62 operates in the forward and backward direction while being combined with the guide member 64.

If the first plate 100 and the second plate 200 are folded, the movable plate 62 moves backward by a predetermined section while the movable plate 62 is combined with the guide member 64, and the hinge member B is entirely exposed.

If the first plate 100 and the second plate 200 are spread, the movable plate 62 moves forward by a predetermined section while being combined with the guide member 64, and a portion at both ends of the hinge member B is inserted into one end of the first plate 100 or the second plate 200, and thus the exposed area of the hinge member B is reduced.

In addition, since the gap between the first plate 100 and the second plate 200 is narrowed as the first plate 100 and the second plate 200 are spread and a portion thereof is inserted into the hinge member B as described above, both ends of the first plate 100 and the second plate 200 pull and tightly spread the flexible display screen (as shown in FIG. 4).

Accordingly, the flexible display screen (not shown) does not have ups and downs, and smoothness thereof can be remarkably improved.

Meanwhile, the hinge member B performs a folding operation of the first and second plates 100 and 200 and generally drives the plates to be folded or spread in a rolling form, rather than a bent form, to have a gentle curvature in order to protect the flexible display substrate from damage.

The hinge member B includes a link piece 2 rotatably combined with the first plate 100 and the second plate 200 and arranged in plurality to tightly contact so as to be bent with respect to each other; a link pin 4 for connecting the link piece 2 arranged in plurality; a tension member 5 combined with the link pin and generating a fixing force to be fixed when the link piece performs a rotation operation; and a plate spring 6 for wrapping the outer surface of the hinge member B and having an elastic force, in which one end is connected to the first plate 100, and the other end is connected to the second plate 200.

The link piece 2 is formed in the shape of a bar having a cross section of a rectangular shape with a predetermined length, in which inclined surfaces 22 are symmetrically formed on both side surfaces, and pin coupling units 23 and 23' for inserting the link pin 4 are formed at one side or both sides. The link pin 4 is combined with the pin coupling units 23 and 23', and the tension member 5 combined with the link pin 4 is inserted.

The pin coupling units 23 and 23' are formed in a cylindrical shape in plurality on one side of the link piece 2 to be spaced from each other at regular intervals, and thus an insertion space 24 for inserting the tension member 5 is formed between the pin coupling units 23 and 23'.

The tension member 5 includes a fixed body 52 tightly attached at one side of the pin coupling units 23 and 23', having a penetration hole formed to pass through the link pin 4, and having a plurality of latching depressions 520 formed on one side surface in a radial shape; a movable body 54 having a penetration hole formed to pass through the link pin 4, tightly attached to the fixed body 52, and having a plurality of latching projections 542 corresponding to the plurality of latching depressions on one side surface; and a spring 56 combined with the link pin 4, in which one end is tightly attached to the pin coupling units 23 or 23' at one side and the other end is tightly attached to the movable body 54 to generate a force pushing the movable body 54.

The plate spring 6 includes a first panel unit 61 and a second panel unit 62 respectively connected to the first plate 100 and the second plate 200, and a bending part 63 connected to the first panel unit 61 and the second panel unit 62 and mounted on the outer surface of the hinge member B.

The bending part 63 is fixedly mounted on the outer surface of the link piece 2 in a fixing method such as welding or bolt engagement.

The operation of the hinge member configured as such is described below.

If the flexible display device according to the present invention is folded, i.e., if the first plate 100 and the second plate face each other, the hinge member B is rolled forming a circular shape.

Since the hinge member B is rolled at a gentle curvature, it forms a curved line so as not to modify the shape of the flexible display screen.

In addition, since a stress is generated while the plate spring 6 is bent, an elastic restoration force for naturally spreading the plates is applied when the force folding the first and second plates 100 and 200 is removed.

However, as described above, since a predetermined amount of braking force may be generated by the pressure applied by the spring 56 of the tension member 5 and a selective latching operation between the latching projections 542 and the latching depressions 520 of the movable body 54 and the fixed body 52 and thus a force for fixing an angle may be provided to the folding operation of the hinge member B, a folding angle between the first plate 100 and the second plate 200 may be set.

That is, since the latching projections 542 of the movable body 54 may be combined with and fixed to the latching depressions 520 of the fixed body 52 while the movable body 54 is supported by the pushing force of the spring 56, the combined state between the fixed body 52 and the movable body 54 can be maintained by the pushing force of the spring as far as the hinge member B is folded or spread by an external force, and thus the spreading angle of the hinge member may be appropriately set.

According to the present invention, in a portable terminal device provided with a flexible display screen having bending capability, a fixing force may be generated to stably maintain an appropriate angle in an opened state, and since the folding portion is not excessively folded or spread, damage of the display may be prevented.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A flexible display device having a guide member, the device comprising:
    a first plate and a second plate for attaching a flexible display screen having bending capability on a front side;
    a hinge member B for connecting the first plate and the second plate and performing a folding operation while being bent or spread; and
    a variable means formed at each of the first plate and the second plate, configured of a movable plate connected to the hinge member and the guide member combined with the movable plate to guide forward and backward movement of the movable plate, and associated with the folding operation of the first plate and the second plate,
    wherein the hinge member includes:
    a link piece rotatably combined with the first plate and the second plate and arranged in plurality to tightly contact so as to be bent with respect to each other;
    a link pin for connecting the link piece arranged in plurality;
    a tension member combined with the link pin and generating a fixing force to be fixed when the link piece performs a rotation operation; and
    a plate spring for wrapping an outer surface of the hinge member and having an elastic force, in which one end is connected to the first plate, and the other end is connected to the second plate,
    wherein the link piece is formed in a shape of a bar having a cross section of a rectangular shape with a predetermined length, in which inclined surfaces are symmetrically formed on both side surfaces, and pin coupling units for inserting the link pin are formed at one side or both sides, and the link pin is combined with the pin coupling units, and the tension member combined with the link pin is inserted, wherein the tension member includes:
    a fixed body tightly attached at one side of the pin coupling units, having a penetration hole formed to pass through the link pin, and having a plurality of latching depressions formed on one side surface in a radial shape;
    a movable body having a penetration hole formed to pass through the link pin, tightly attached to the fixed body, and having a plurality of latching projections corresponding to the plurality of latching depressions on one side surface; and
    a spring combined with the link pin, in which one end is tightly attached to the pin coupling units at one side and the other end is tightly attached to the movable body to generate a force pushing the movable body.

2. The device according to claim 1, wherein the guide member includes:
    a flat panel unit attached to the first plate or the second plate; and
    a rail bent at both ends of the flat panel unit to be formed in the shape of character 'ㄷ'.

3. The device according to claim 2, wherein the flat panel unit includes:
    a concave part concaved downwards to be inserted into and combined with insides of the first plate and the second plate; and
    a resting step protruded at both ends of the concave part.

4. The device according to claim 1, wherein the movable plate has a connection pipe formed at one end to be connected to the hinge member and a stepped portion formed at one side to be insertedly combined with a rail.

* * * * *